US012529985B2

(12) United States Patent
Abe et al.

(10) Patent No.: US 12,529,985 B2
(45) Date of Patent: Jan. 20, 2026

(54) BELT DEVICE INCLUDING A BELT GUIDE ON AN INNER CIRCUMFERENTIAL SURFACE OF A BELT , FIXING DEVICE, AND IMAGE FORMING APPARATUS

(71) Applicants: Hiroya Abe, Kanagawa (JP); Atsuo Hirai, Kanagawa (JP)

(72) Inventors: Hiroya Abe, Kanagawa (JP); Atsuo Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/727,175

(22) PCT Filed: Dec. 22, 2022

(86) PCT No.: PCT/IB2022/062652

§ 371 (c)(1),
(2) Date: Jul. 8, 2024

(87) PCT Pub. No.: WO2023/148552

PCT Pub. Date: Aug. 10, 2023

(65) Prior Publication Data

US 2025/0076796 A1 Mar. 6, 2025

(30) Foreign Application Priority Data

Feb. 3, 2022 (JP) ................................ 2022-015727

(51) Int. Cl.
*G03G 15/20* (2006.01)

(52) U.S. Cl.
CPC .................. *G03G 15/2053* (2013.01); *G03G 2215/2038* (2013.01)

(58) Field of Classification Search
USPC ........................................................ 399/329
See application file for complete search history.

(56) References Cited

U.S. PATENT DOCUMENTS

2011/0142501 A1 6/2011 Kamiya et al.
2012/0134721 A1 5/2012 Abe et al.
(Continued)

FOREIGN PATENT DOCUMENTS

JP 2002-062748 A 2/2002
JP 2009-134172 A 6/2009
(Continued)

OTHER PUBLICATIONS

Text Summary of JP2018-180326A to Takashi (Year: 2018).*
(Continued)

*Primary Examiner* — Quana Grainger
(74) *Attorney, Agent, or Firm* — Harness, Dickey & Pierce, P.L.C.

(57) ABSTRACT

A belt device includes a rotatable belt, a pressure rotator opposite to the belt, a nip formation pad, a belt guide, a member, and lubricant. The nip formation pad is disposed inside a loop of the belt to form a nip between the belt and the pressure rotator. The belt guide is disposed on an inner circumferential surface of the belt. The member comes into contact with an end of the belt guide in a width direction of the belt. The lubricant is applied between the inner circumferential surface of the belt and the nip formation pad. A difference between a solubility parameter of the lubricant and a solubility parameter of the belt guide is 0.5 $MPa^{0.5}$ or more.

20 Claims, 3 Drawing Sheets

(56) References Cited

U.S. PATENT DOCUMENTS

| | | | |
|---|---|---|---|
| 2012/0230740 | A1 | 9/2012 | Mikami et al. |
| 2012/0294655 | A1 | 11/2012 | Terasaka et al. |
| 2013/0236216 | A1 | 9/2013 | Innami et al. |
| 2014/0079445 | A1 | 3/2014 | Katoh et al. |
| 2014/0199098 | A1 | 7/2014 | Abe et al. |
| 2014/0356031 | A1 | 12/2014 | Moro et al. |
| 2015/0132033 | A1 | 5/2015 | Abe et al. |
| 2015/0346631 | A1 | 12/2015 | Abe et al. |
| 2020/0387098 | A1 | 12/2020 | Abe et al. |

FOREIGN PATENT DOCUMENTS

| | | | | |
|---|---|---|---|---|
| JP | 2014153403 | A | * | 8/2014 |
| JP | 2018-180326 | A | | 11/2018 |
| JP | 2021-196571 | A | | 12/2021 |

OTHER PUBLICATIONS

Text Summary of JP2021196571A to Yumiko. (Year: 2021).*
International Search Report and Written Opinion issued on Mar. 13, 2023 inPCT/IB2022/062652 filed on Dec. 22, 2022.

* cited by examiner

BELT DEVICE INCLUDING A BELT GUIDE ON AN INNER CIRCUMFERENTIAL SURFACE OF A BELT , FIXING DEVICE, AND IMAGE FORMING APPARATUS

CROSS-REFERENCE TO RELATED APPLICATIONS

This application is a national phase under 35 U.S.C. § 371 of PCT International Application No. PCT/IB2022/062652 which has an International filing date of Dec. 22, 2022, which claims priority to Japanese Application No. 2022-015727, filed Feb. 3, 2022, the entire contents of each of which are hereby incorporated by reference.

TECHNICAL FIELD

Embodiments of the present disclosure generally relate to a belt device, a fixing device incorporating the belt device, and an image forming apparatus incorporating the fixing device.

BACKGROUND ART

One type of belt device includes a rotatable belt, a pressure rotator, and a nip formation pad in sliding contact with an inner circumferential surface of the belt to form a nip with the pressure rotator via the belt. Lubricant is applied between the nip formation pad and the belt to reduce a frictional force between the nip formation pad and the inner circumferential surface of the belt. For example, a fixing device as the belt device includes an endless fixing belt, a pressure roller as the pressure rotator, and the nip formation pad in sliding contact with an inner circumferential surface of the fixing belt to form a fixing nip with the pressure roller via the fixing belt. The lubricant is applied between the nip formation pad and the fixing belt to reduce the frictional force between the nip formation pad and the inner circumferential surface of the fixing belt.

Japanese Patent No. 5133036 discloses the above-described fixing device, and the fixing device includes belt guides on both ends of the fixing belt in a width direction to restrict the skew of the fixing belt.

CITATION LIST

Patent Literature

[PTL 1]
Japanese Patent No. 5133036

SUMMARY OF INVENTION

Technical Problem

Lubricant flows along the belt toward the belt guide that restricts the belt from moving in the width direction and infiltrates into the belt guide and adhesive that bonds the belt guide to the belt, causing the belt guide to fall off from the belt. An object of the present disclosure is preventing the belt guide from falling off from the belt.

Solution to Problem

According to embodiments of the present disclosure, a belt device includes a rotatable belt, a pressure rotator opposite to the belt, a nip formation pad, a belt guide, a member, and lubricant. The nip formation pad is disposed inside a loop of the belt to form a nip between the belt and the pressure rotator. The belt guide is disposed on an inner circumferential surface of the belt. The member comes into contact with an end of the belt guide in a width direction of the belt. The lubricant is applied between the inner circumferential surface of the belt and the nip formation pad. A difference between a solubility parameter of the lubricant and a solubility parameter of the belt guide is 0.5 $MPa^{0.5}$ or more.

Advantageous Effects of Invention

The present disclosure can prevent a belt guide from falling off from a belt.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
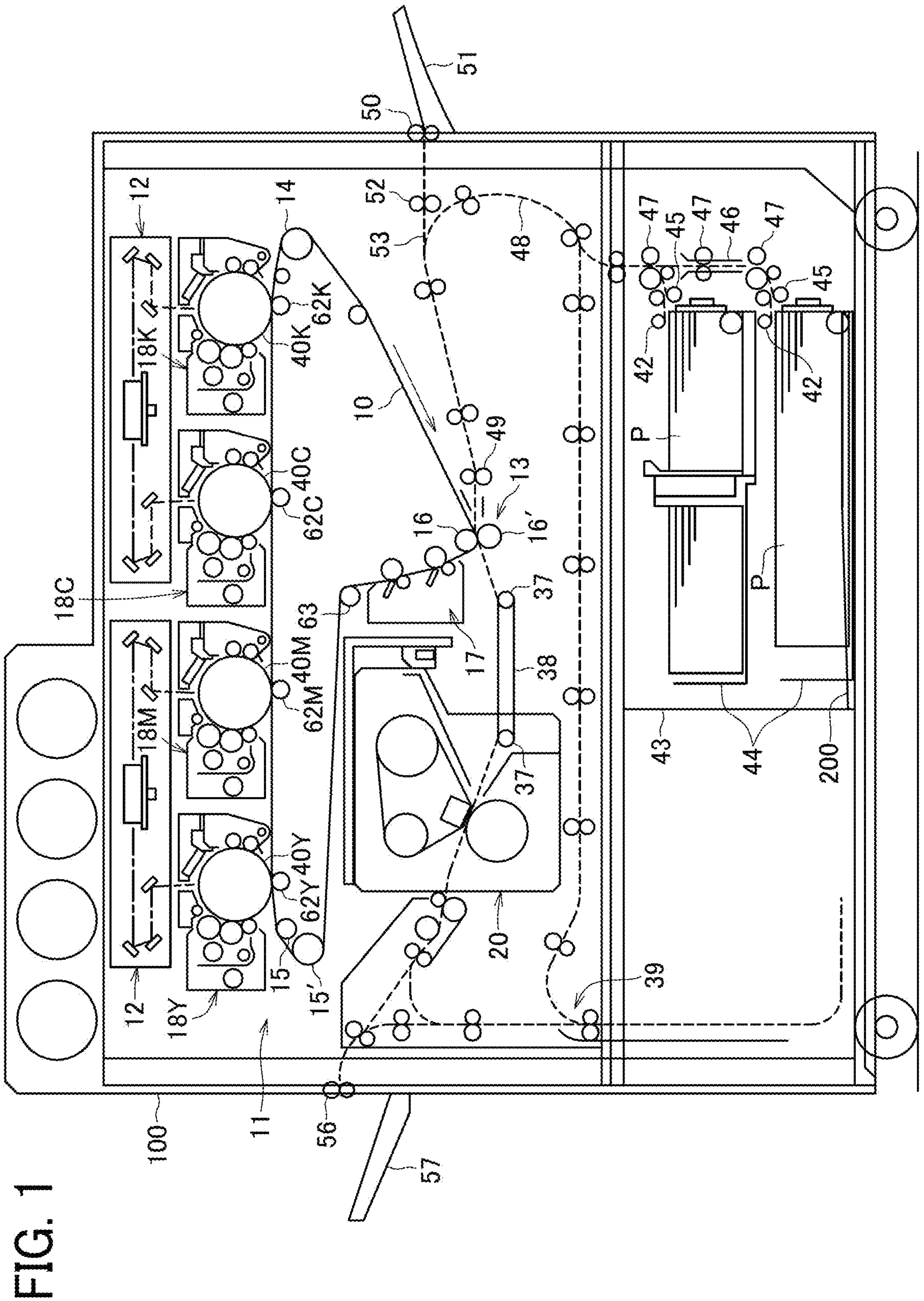
FIG. 1 is a schematic sectional side view of an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise. In the drawings illustrating the following embodiments, the same reference numbers are allocated to elements having the same function or shape and redundant descriptions thereof are omitted below.

With reference to FIG. 1, the following describes an image forming apparatus 100 according to the present embodiment of present disclosure. The image forming apparatus according to the present embodiment may be a printer, a copier, and a fax machine. The image forming apparatus 100 uses toner to form a toner image and includes a fixing device as an example of a belt device according to the present embodiment for fixing the toner image (an unfixed image) formed on a recording medium.

FIG. 1 is a schematic sectional side view of the image forming apparatus 100 according to the present embodiment, illustrating a schematic configuration of the image forming apparatus 100. The image forming apparatus 100 employs a tandem structure in which a plurality of image forming devices for forming toner images in different colors is arranged. The image forming apparatus 100 also employs an intermediate transfer structure in which the toner image is transferred onto the recording medium via an intermediate transfer belt from a photoconductor. The image forming apparatus 100 includes a sheet feeding table 200 including sheet feeding trays 44 in a lower portion of the image forming apparatus 100.

In an upper portion of the image forming apparatus 100, the image forming apparatus 100 includes a tandem image forming section 11 having the tandem structure. The image forming section 11 includes a plurality of image forming devices 18Y, 18M, 18C, and 18K arranged side by side. Suffixes Y, M, C, and K represent yellow, magenta, cyan, and black, respectively.

The image forming apparatus 100 includes an endless belt-shaped intermediate transferor, hereinafter called an intermediate transfer belt 10, situated in a substantially center portion of the image forming apparatus 100. The intermediate transfer belt 10 is entrained around and supported by a plurality of support rollers 14, 15, 15', 16, and the like. The intermediate transfer belt 10 is rotatable in a clockwise direction in FIG. 1.

In a configuration illustrated in FIG. 1, the image forming apparatus 100 includes a belt cleaner 17 disposed downstream from one of the support rollers that is a secondary-transfer backup roller 16 in a direction of rotation of the intermediate transfer belt 10 to clean the intermediate transfer belt 10. The belt cleaner 17 removes residual toner remaining on the intermediate transfer belt 10 after the toner image formed on the intermediate transfer belt 10 is transferred.

The intermediate transfer belt 10 is stretched between the support roller 14 and the support roller 15. On the intermediate transfer belt 10, the four image forming devices 18Y, 18M, 18C, and 18K for yellow (Y), magenta (M), cyan (C), and black (K) are arranged along the conveyance direction of the intermediate transfer belt 10.

The four image forming devices 18Y, 18M, 18C, and 18K thus aligned laterally constitute the tandem image forming section 11 described above. The image forming devices 18Y, 18M, 18C, and 18K in the tandem image forming section 11 include photoconductor drums 40Y, 40M, 40C, and 40K as image bearers to bear toner images of yellow, magenta, cyan, and black, respectively.

Above the tandem image forming section 11, the image forming apparatus 100 includes two exposure devices 12. The left exposure device 12 is disposed opposite the two image forming devices 18Y and 18M. The right exposure device 12 is disposed opposite the two image forming devices 18C and 18K. Each of the exposure devices 12 employs an optical scanning system and includes a light source device such as a semiconductor laser, a semiconductor laser array, or a multi-beam light source. In addition, each of the exposure devices 12 includes a coupling optical system, a common light deflector such as a polygon mirror, and a dual-system scanning image forming optical system.

The exposure devices 12 expose the photoconductor drums 40Y, 40M, 40C, and 40K according to yellow, magenta, cyan, and black image data, forming electrostatic latent images on the photoconductor drums 40Y, 40M, 40C, and 40K, respectively.

Each of the image forming devices 18Y, 18M, 18C, and 18K includes a charging device, a developing device, and a cleaning device around each of the photoconductor drums 40Y, 40M, 40C, and 40K. The charging devices uniformly charge the photoconductor drums 40Y, 40M, 40C, and 40K, respectively. Next, the exposure devices 12 expose the photoconductor drums 40Y, 40M, 40C, and 40K to form electrostatic latent images on the photoconductor drums 40Y, 40M, 40C, and 40K. The developing device develops the electrostatic latent image with toner of each color. The cleaning devices remove residual toner failed to be transferred onto the intermediate transfer belt 10, the residual toner remaining on the photoconductor drums 40Y, 40M, 40C, and 40K therefrom, respectively.

In addition, the image forming apparatus 100 includes primary transfer rollers 62Y, 62M, 62C, and 62K at primary transfer positions to transfer the toner image from each of the photoconductor drums 40Y, 40M, 40C, and 40K onto the intermediate transfer belt 10. As a result, a full-color toner image is formed on the intermediate transfer belt 10. The primary transfer rollers 62Y, 62M, 62C, and 62K are opposite the photoconductor drums 40Y, 40M, 40C, and 40K, and the intermediate transfer belt 10 is sandwiched between the primary transfer rollers 62Y, 62M, 62C, and 62K and the photoconductor drums 40Y, 40M, 40C, and 40K. The primary transfer rollers 62Y, 62M, 62C, and 62K function as primary transferors.

Among the plurality of support rollers that support the intermediate transfer belt 10, the support roller 14 is a drive roller that drives and rotates the intermediate transfer belt 10. The support roller 14 is coupled to a motor through a driving force transmitter such as a gear, a pulley, and a belt. When the image forming apparatus 100 forms a black monochrome image on the intermediate transfer belt 10, a transfer mechanism moves the support rollers 15 and 15' other than the support roller 14 to separate the intermediate transfer belt 10 from the photoconductor drums 40Y, 40M, and 40C. In addition to the plurality of support rollers 14, 15, 15', and 16, a backup roller 63 is disposed to support the intermediate transfer belt 10 from outside the loop formed by the intermediate transfer belt 10.

A secondary transfer device 13 is disposed opposite the tandem image forming section 11 via the intermediate transfer belt 10. The secondary transfer device 13 includes a secondary transfer roller 16' pressed against the secondary-transfer backup roller 16 via the intermediate transfer belt 10. A transfer electrical field is formed between the secondary transfer roller 16' and the secondary-transfer backup roller 16 to transfer the toner image from the intermediate transfer belt 10 onto a recording medium P that is a sheet.

Downstream from the secondary transfer device 13 in a direction in which the recording medium P is conveyed, a fixing device 20 is disposed to fix the transferred toner image onto the recording medium P. After the secondary transfer device 13 transfers the toner image onto the recording medium P, a conveyance belt 38 supported by two conveyance rollers 37 conveys the recording medium P to the fixing device 20. Instead of the conveyance belt 38, a stationary guide, a conveyance roller, or the like may be used.

The image forming apparatus 100 includes a sheet reverse device 39 below the tandem image forming section 11, the secondary transfer device 13 and the fixing device 20. The sheet reverse device 39 reverses and conveys the recording medium P to form another toner image on a back side of the recording medium P and record the toner images on both sides of the recording medium P.

To provide a fuller understanding of the embodiments of the present disclosure, a description is now given of an image forming operation together with conveyance of the recording medium P in the image forming apparatus 100, with continued reference to FIG. 1. Initially, one of sheet feeding rollers 42 in the sheet feeding table 200 is selected and rotated to pick up and feed the recording media P from one of the plurality of sheet feeding trays 44 layered in a paper bank 43. A separation roller 45 separates the recording medium P from other recording media P resting on the sheet feeding tray 44 and feeds the recording medium to a first sheet conveyance passage 46. A conveyor roller pair 47 conveys the recording medium P along the first sheet conveyance passage 46 to a second sheet conveyance passage 48, defined by some internal components of the image forming apparatus 100. The recording medium P conveyed along the second sheet conveyance passage 48 strikes a registration roller pair 49 as a positioning roller pair, which halts the recording medium P temporarily.

Instead of feeding the recording medium P from the sheet feeding table 200, a recording medium P can be manually imported into the image forming apparatus 100 by use of a bypass feeder 51, on which recording media P can be placed. A sheet feeding roller 50 is rotated to pick up the recording media P from the bypass feeder 51 and send the recording media P to a separation roller 52. The separation roller 52 sends the recording medium P to a bypass conveyance passage 53 one by one. Like the recording medium P conveyed from the sheet feeding table 200, the recording medium P conveyed from the bypass feeder 51 comes into contact with the registration roller pair 49 and stops temporarily.

Subsequently, in synchronization with movement of the full-color toner image formed on the intermediate transfer belt 10, the registration roller pair 49 is rotated to send the recording medium P to a secondary transfer position between the intermediate transfer belt 10 and the secondary transfer roller 16'. Thus, the full-color toner image formed on the intermediate transfer belt 10 is collectively transferred from the intermediate transfer belt 10 onto the recording medium P.

Then, the conveyance belt 38 conveys the recording medium P bearing the full-color toner image to the fixing device 20. The fixing device 20 fixes the full-color toner image onto the recording medium P under heat and pressure. The recording medium P bearing the fixed toner image is conveyed to an ejection roller pair 56. The ejection roller pair 56 ejects the recording medium P onto an output tray 57. Thus, the recording media P are stacked on the output tray 57.

In duplex printing, after the full-color toner image is fixed on one side of the recording medium P, the recording medium P is conveyed to the sheet reverse device 39, turned upside down, and conveyed again to the secondary transfer position. At the secondary transfer position, another full-color toner image is transferred onto the back side of the recording medium P. The recording medium P is then conveyed to the fixing device 20 that fixes another full-color toner image onto the back side of the recording medium P. Thereafter, the ejection roller pair 56 ejects the recording medium P to the output tray 57.

Figure 2:
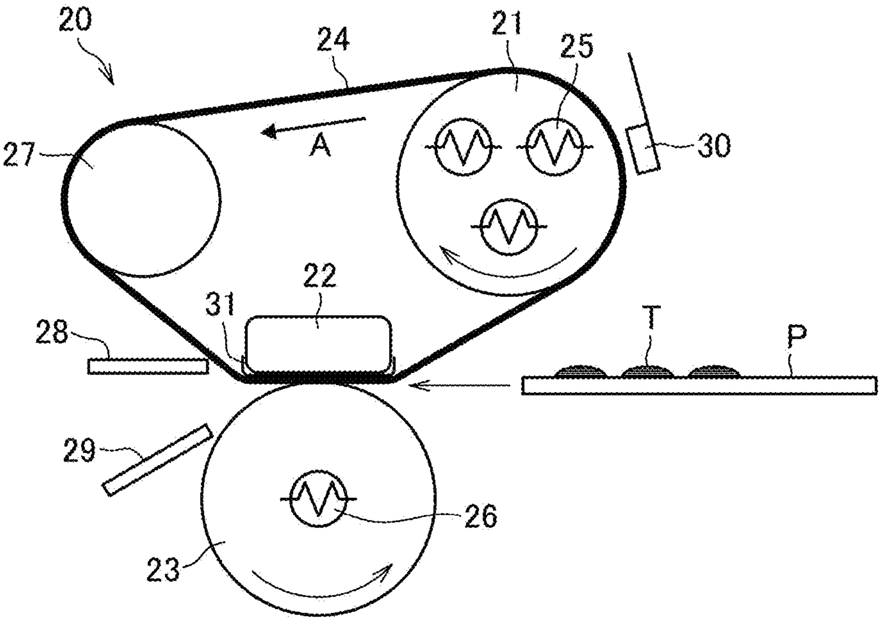
FIG. 2 is a schematic sectional side view of a fixing device according to the embodiment of the present disclosure.

FIG. 2 is a schematic sectional side view of the fixing device 20 as the belt device according to the present embodiment in a section perpendicular to the axial direction of a pressure roller 23.

As illustrated in FIG. 2, the fixing device 20 includes a heating roller 21, a pressure pad 22 as a nip formation pad, a tension roller 27, the pressure roller 23 as a pressure rotator, a fixing belt 24, and heaters 25 and 26 as heat sources. The fixing belt 24 is stretched around the heating roller 21, the pressure pad 22, and the tension roller 27. The pressure roller 23 presses the pressure pad 22 via the fixing belt 24 to form a fixing nip as a nip between the pressure roller 23 and the fixing belt 24. The heating roller 21, the pressure pad 22, the pressure roller 23, and the fixing belt 24 extend in a longitudinal direction that is orthogonal to the paper surface of FIG. 2. The longitudinal direction is also a width direction of the fixing belt 24 and also a width direction of the recording medium P passing through the fixing device 20.

The heater 25 is inside the heating roller 21. The heater 26 is inside the pressure roller 23.

The fixing device 20 heats the recording medium P bearing an unfixed toner image T (the transferred full-color toner image) and passing through the fixing nip to fix the toner image T onto the recording medium P. The fixing nip is formed between the fixing belt 24 and the pressure roller 23 by pressure contact between the pressure pad 22 and the pressure roller 23. A housing of the fixing device 20 rotatably supports both ends of a shaft of the heating roller 21 and both ends of a shaft of the pressure roller 23 in the longitudinal direction, and a driving unit of each roller and the like are fixed and held by the housing.

The fixing device 20 includes a separation plate 28 near the fixing belt 24 and a separation plate 29 near the pressure roller 23. The separation plate 28 or 29 separates the leading end of the recording medium P that has passed through the fixing nip from the fixing belt 24 or the pressure roller 23. Subsequently, the recording medium P is ejected from the fixing device 20. The separation plates 28 and 29 serving as separators disposed near the pressure pad 22 and the pressure roller 23, respectively, are not limited to plate-shaped members, and separation claws may be used.

The heating roller 21 heats the surface of the fixing belt 24 upstream from the fixing nip.

The heating roller 21 is, for example, a thin cylindrical body made of metal, and the heater 25 is fixed inside the cylindrical body. As the heater 25, for example, a halogen heater, a carbon heater, or the like may be used. Both ends of the heater 25 are fixed to the housing of the fixing device 20. The heater 25 may be an induction heating unit (IH heating unit) that heats the heating roller 21 from the outside of the heating roller 21.

A power supply unit in the image forming apparatus (that is, an alternating-current power supply unit) controls an output of the heater 25. Radiant heat from the heater 25 heats the heating roller 21. The heating roller 21 heats the surface of the fixing belt 24, and the fixing belt 24 heats the unfixed toner image T on the recording medium P. A temperature sensor 30 such as a thermopile detects a surface temperature of the fixing belt 24. The output of the heater 25 is controlled based on a result detected by the temperature sensor 30. The thermopile is at a position facing the surface of the fixing belt 24. The position and the number of the temperature sensor 30 are not limited to the above. For example, a temperature sensor detecting the temperature of the pressure roller 23 may be additionally provided, and the heaters 25 and 26 may be controlled based on results detected by the temperature sensors.

The fixing belt 24 is stretched around the heating roller 21 and the tension roller 27 and rotates while sliding on the pressure pad 22.

The pressure pad 22 is disposed along an axial direction of the fixing belt 24 and receives the pressing force of the pressure roller 23. At this time, the shape of the fixing nip N is defined. A support such as a stay supports and fixies the pressure pad 22. The support prevents the pressure pad 22 from being bent by the pressing force of the pressure roller 23 to obtain a uniform nip width over the axial direction of the pressure roller 23.

The pressure pad 22 is made of heat-resistant material. Thus, the pressure pad 22 is immune from thermal deformation at temperatures in a fixing temperature range desirable to fix the toner image on the recording medium P, thereby retaining the shape of the fixing nip N and the quality of the toner image formed on the recording medium P. For example, the pressure pad 22 is made of general heat-resistant resin such as polyether sulfone (PES), polyphenylene sulfide (PPS), liquid crystal polymer (LCP), polyether nitrile (PEN), polyamide imide (PAI), and polyether ether ketone (PEEK).

The fixing device 20 includes a sliding sheet 31 fixed on a surface of the pressure pad 22. The sliding sheet 31 is impregnated with lubricant such as silicone oil or fluorine grease to reduce the sliding friction of the fixing belt 24 caused by the pressure pad 22. The sliding sheet 31 may be disposed on at least a surface of the pressure pad 22 facing the fixing belt 24 (that is, a sliding surface of the pressure pad 22). The fixing belt 24 rotates and slides on the sliding sheet 31 that is a low-friction sheet. As a result, the low-friction sheet reduces the driving torque to drive the fixing belt 24 and the load caused by the frictional force on the fixing belt 24. However, the lubricant may be applied between the inner circumferential surface of the fixing belt 24 and the pressure pad 22 without providing the sliding sheet 31. In addition, the fixing device 20 may include a lubricant supplier such as a supply roller that supplies the lubricant to the sliding sheet 31 or a portion between the inner circumferential surface of the fixing belt 24 and the pressure pad 22.

The fixing belt 24 is, for example, an endless belt having a two-layer structure formed by a base layer made of nickel, stainless steel, or polyimide and an elastic layer such as a silicone rubber layer on the base layer.

The fixing belt 24 may be an endless belt having a multilayer structure. The multilayer structure includes, for example, the base layer made of polyimide (PI) resin, the elastic layer such as a silicone rubber layer on the base layer, and a release layer on the elastic layer that are sequentially layered.

The elastic layer, for example, having a layer thickness of about 200 μm, is made of an elastic material such as silicone rubber, fluororubber, silicone rubber foam, and the like. The release layer, for example, having a layer thickness of about 20 μm, is made of tetrafluoroethylene-perfluoro (alkyl vinyl ether) copolymer (PFA), polyimide (PI), polyether imide (PEI), polyether sulfide (PES), or the like. The release layer as a surface layer of the fixing belt 24 facilitates separation of toner contained in the toner image formed on the sheet P from the fixing belt 24.

The pressure roller 23 includes a cored bar made of metal such as stainless steel (for example, SUS 304) and an elastic layer coating the cored bar with fluororubber, silicone rubber, silicone rubber foam, or the like. The heater 26 disposed inside the cylindrical body of the pressure roller 23 can prevent the temperature at the fixing nip from falling down. The heater 26 may not be disposed inside the pressure roller 23.

Controlling the pressing force (in other words, pressure) of the pressure roller 23 pressing against the pressure pad 22 enables controlling the nip width of the fixing nip.

In the fixing device 20, a driver drives and rotates the pressure roller 23 in a direction indicated by an arrow in FIG. 2, and the rotating pressure roller 23 moves the fixing belt 24 while sliding on the pressure pad 22. Alternatively, the driver may drive and rotate the heating roller 21 in a direction indicated by an arrow in FIG. 2 to apply a conveyance driving force to the fixing belt 24.

Figure 3:
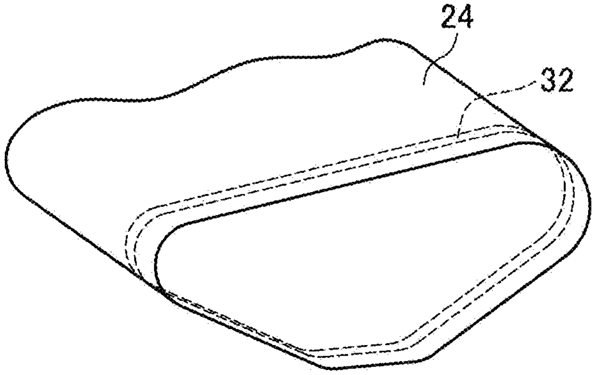
FIG. 3 is a perspective view of a fixing belt.

Next, referring to FIG. 3, a belt guide 32 is described. The belt guide 32 is disposed on the fixing belt 24 and serves as a restriction member to restrict the fixing belt 24 from skewing. FIG. 3 is a perspective view of the fixing belt 24.

As illustrated in FIG. 3, the belt guides 32 are disposed on both ends of the inner circumferential surface of the fixing belt 24 in the width direction of the fixing belt 24. Each belt guide 32 has an endless ring-shape along the loop of the inner circumferential surface of the fixing belt 24. The belt guides 32 are attached to the fixing belt 24 to form one component. For example, the belt guide 32 is made of fluororubber or the like and is bonded to the fixing belt 24 using a heat-resistant adhesive. FIG. 3 illustrates the belt guide 32 attached to one end of the fixing belt 24 in the width direction, but the other belt guide 32 is similarly attached to the other end of fixing belt 24 in the width direction.

Note that the end of the fixing belt 24 in the width direction on which the belt guide 32 is disposed is at least either one of both end regions in three regions formed by dividing the fixing belt 24 into three regions in the width direction.

In particular, the belt guide 32 in the present embodiment is disposed in the vicinity of the end of the fixing belt 24 in the width direction.

Figure 5:
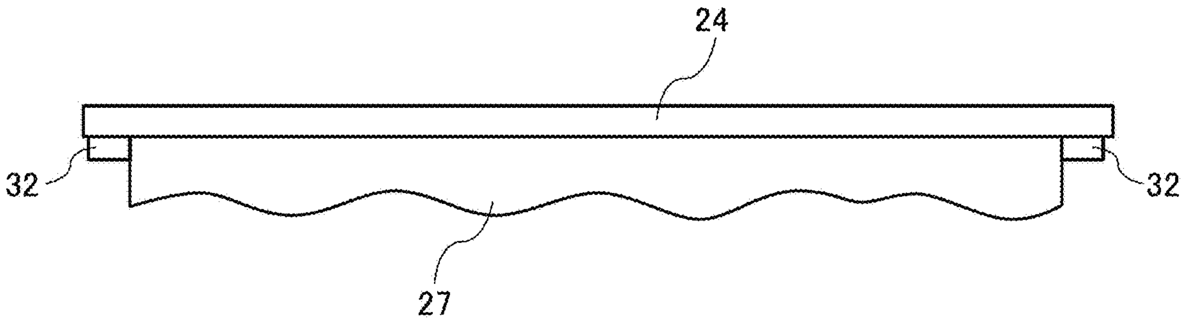
FIG. 5 is a partial perspective view of the fixing belt and a tension roller viewed from a direction indicated by an arrow A in FIG. 2.

The belt guide 32 disposed on the end of the fixing belt 24 in the width direction of the fixing belt 24 restricts movement of the fixing belt 24 in the width direction. Specifically, as illustrated in FIG. 5, an end of the belt guide 32 in the width direction is brought into contact with an end of the tension roller 27 in the width direction if the fixing belt 24 moves into the width direction. As a result, the belt guide restricts the movement of the fixing belt 24 in the width direction. The above-described configuration can prevent the skew of the rotating fixing belt 24, that is, the movement toward the front side of FIG. 2 in a direction perpendicular to the sheet surface of FIG. 2 or the movement toward the back side of FIG. 2 in the direction. A member that comes into contact with the belt guide 32 to restrict the movement of the fixing belt 24 in the width direction is not limited to the tension roller 27. The belt guide 32 may come into contact with an end of the heating roller 21 in the width direction of the fixing belt 24 or an end of a stationary member such as the pressure pad 22 in the width direction of the fixing belt 24. The belt guide 32 may be disposed on only one end of the fixing belt in the width direction. In this case, loop lengths of both ends of the fixing belt are adjusted so that the fixing belt skews toward one direction.

The lubricant applied between the inner circumferential surface of the fixing belt 24 and the pressure pad 22 may move along the rotating fixing belt 24 in the width direction of the fixing belt 24 and adhere to the belt guide 32. Then, the lubricant enters the molecular structure of the adhesive that bonds the belt guide 32 to the fixing belt 24 and the molecular structure of the belt guide 32. The above-described lubricant causes the expansion of the belt guide 32 or adhesion failure between the belt guide 32 and the fixing belt 24. As a result, the belt guide 32 falls off from the fixing belt 24.

To avoid the above-described disadvantage, the material of the belt guide 32 and the lubricant in the present embodiment have solubility parameters having the difference that is 0.5 $(MPa)^{0.5}$ or more. Hereinafter, the solubility parameter is also referred to as a SP value. Setting the difference between the solubility parameter of the lubricant and the solubility parameter of the material of the belt guide 32 to be 0.5 $(MPa)^{0.5}$ or more prevents the lubricant from entering the molecular structure of the belt guide 32. As a result, the above-described setting can prevent the belt guide 32 from falling off from the fixing belt 24 and to maintain good adhesion between the belt guide 32 and the fixing belt 24 for a long time.

Figure 4:
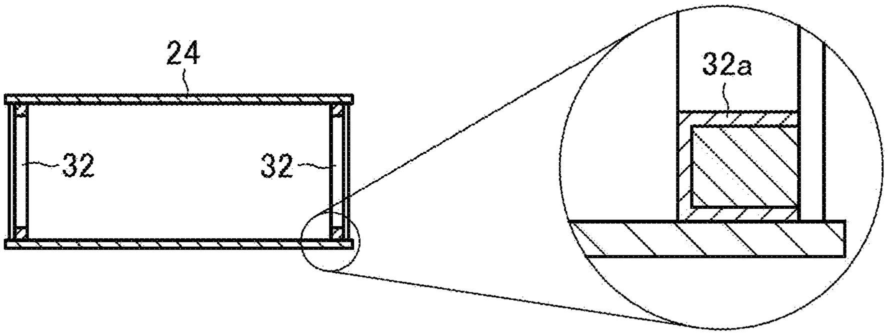
FIG. 4 is a cross-sectional view of the fixing belt including a belt guide according to another embodiment of the present disclosure.

If the belt guide 32 includes a plurality of portions made of different materials, a part of the portions may have the above-described solubility parameter. For example, the solubility parameter of the main material of the belt guide 32 may be set as described above. Alternatively, the portion of the belt guide 32 that is likely to come into contact with the lubricant may be made of the material having the above-described solubility parameter. For example, as illustrated in FIG. 4, one portion 32*a* of the belt guide 32 including an outer surface of the belt guide 32 may be made of the material having the above-described solubility parameter, and other portions may be made of another material (for example, a more inexpensive material). The above-described setting can improve the degree of freedom in selecting the material of the belt guide 32 and reduce the cost of the belt guide 32.

In the present embodiment, the difference between the solubility parameter of the lubricant and the solubility parameter of the adhesive that bonds the belt guide 32 to the fixing belt 24 is set to 0.5 $(MPa)^{0.5}$ or more.

The above-described setting prevents the lubricant from entering the molecular structure of the adhesive. As a result, the above-described setting can prevent the belt guide 32 from falling off the fixing belt 24. Thus, the life of the fixing device can be extended.

As a method for measuring the solubility parameter (the SP value), any one of the following methods can be appropriately used.

The SP value of compound having a low molecular weight is directly determined from the evaporation energy of the compound. The SP value of compound having a high molecular weight that is, polymer is measured by various methods. For example, the SP value of the polymer is determined based on the solubility in a solvent having a known SP value, the osmotic pressure of a polymer solution, the degree of swelling of a crosslinked polymer, or a change in turbidity when a poor solvent is added to a polymer solution that is called a turbidity titration method. The SP value of the polymer may be calculated by an atomic group contribution method that calculates and estimates the SP value based on a parameter given for each chemical structure. Typical calculation methods include the Hansen method, the Hildebrand method, the Fedors method, the Van Krevelen method, the Hoy method, and the Small method.

A preferable material for the belt guide 32 is at least one of silicone rubber, fluorosilicone rubber, and fluorine rubber. In other words, the belt guide 32 may be made of the silicone rubber. The belt guide 32 may be made of the fluorosilicone rubber. Instead of the silicone rubber, the belt guide 32 may be made of the fluorine rubber. The belt guide 32 may be made of both the silicone rubber and the fluorine rubber. The belt guide 32 made of the above-described material can have heat resistance that prevents deterioration due to use under a high temperature environment (for example, 200° C.) in the fixing device.

The belt guide 32 made of the above-described material can have flexibility to follow the shape change of the fixing belt 24.

A preferable material for the adhesive to bond the belt guide 32 to the fixing belt 24 is at least one of silicone resin, fluorosilicone resin, and fluororesin. In other words, the adhesive may be made of the silicone resin. The adhesive may be made of the fluorosilicone resin. Instead of the silicone resin, the adhesive may be made of the fluororesin. The adhesive may be made of mixture of the silicone resin and the fluororesin. The adhesive made of the above-described material can have sufficient adhesive strength and heat resistance to prevent deterioration due to use in a high temperature environment in the fixing device.

A preferable material for the lubricant is at least one of silicone oil, fluorosilicone oil, and fluorine oil. In other words, the lubricant may be made of the silicone oil. The lubricant may be made of the fluorosilicone oil. The lubricant may be made of the fluorine oil. Alternatively, the lubricant may include either two of the silicone oil, fluorosilicone oil, and the fluorine oil. The lubricant may include all of the silicone oil, fluorosilicone oil, and the fluorine oil. The lubricant made of the above-described material can have heat resistance to prevent deterioration due to use under a high temperature environment in the fixing device. In addition, the lubricant obtains high lubricity and prevents volatilization of the lubricant, which enables maintaining the high lubricity for a long time.

The following describes results of experiments that examined whether the belt guide falls off from the fixing belt under each of the above-described various differences of SP values in the fixing device including the belt guide, the adhesive, and the lubricant that were made of different materials. The sets of materials tested in the experiments were eight sets that are referred to as a first example to a fifth example and a first comparative example to a third comparative example.

In the first example, the lubricant was "KF968-100CS" that was silicone oil manufactured by Shin-Etsu Chemical Co., Ltd., the material for the belt guide was "FE-281-U" that was fluorosilicone rubber manufactured by Shin-Etsu Chemical Co., Ltd., and the adhesive was "FE-2000" that was fluorosilicone adhesive manufactured by Shin-Etsu Chemical Co., Ltd.

In the second example, the lubricant was "KF968-100CS" that was silicone oil manufactured by Shin-Etsu Chemical Co., Ltd., the material for the belt guide was "FC-2179" that was fluororubber manufactured by 3M Company, and the adhesive was "SIFEL X-71-8094-5A/B" that was fluorine-based adhesive manufactured by Shin-Etsu Chemical Co., Ltd.

In the third example, the lubricant was "FL-100-100CS" that was fluorosilicone oil manufactured by Shin-Etsu Chemical Co., Ltd., the material for the belt guide was "XIAMETER RBB-6660-60" that was silicone rubber manufactured by DuPont Toray Specialty Materials K.K., and the adhesive was "TSE387" that was silicone-based adhesive manufactured by Momentive Performance Materials Japan Inc.

In the fourth example, the lubricant was "FL-100-100CS" that was fluorosilicone oil manufactured by Shin-Etsu Chemical Co., Ltd., the material for the belt guide was "FC-2179" that was fluororubber manufactured by 3M Company, and the adhesive was "SIFEL X-71-8094-5A/B" that was fluorine-based adhesive manufactured by Shin-Etsu Chemical Co., Ltd.

In the fifth example, the lubricant was "BARRIERTA J 800 FLUID" that was fluorine oil manufactured by NOK KLÜBER Co., Ltd., the material for the belt guide was "FE-281-U" that was fluorosilicone rubber manufactured by Shin-Etsu Chemical Co., Ltd., and the adhesive was "FE-2000" that was fluorosilicone adhesive manufactured by Shin-Etsu Chemical Co., Ltd.

In the first comparative example, the lubricant was "KF968-100CS" that was silicone oil manufactured by Shin-Etsu Chemical Co., Ltd., the material for the belt guide was "XIAMETER RBB-6660-60" that was silicone rubber manufactured by DuPont Toray Specialty Materials K.K., and the adhesive was "TSE387" that was silicone-based adhesive manufactured by Momentive Performance Materials Japan Inc.

In the second comparative example, the lubricant was "FL-100-100CS" that was fluorosilicone oil manufactured by Shin-Etsu Chemical Co., Ltd., the material for the belt guide was "FE-281-U" that was fluorosilicone rubber manufactured by Shin-Etsu Chemical Co., Ltd., and the adhesive was "FE-2000" that was fluorosilicone adhesive manufactured by Shin-Etsu Chemical Co., Ltd.

In the third comparative example, the lubricant was "BARRIERTA J 800 FLUID" that was fluorine oil manufactured by NOK KLÜBER Co., Ltd., the material for the belt guide was "FC-2179" that was fluororubber manufactured by 3M Company, and the adhesive was "SIFEL X-71-8094-5A/B" that was fluorine-based adhesive manufactured by Shin-Etsu Chemical Co., Ltd.

The fixing device including each of the above-described sets, that is, the first example to the fifth example and the first comparative example to third comparative example was assembled and incorporated in an electrophotographic image forming apparatus MPC4503 manufactured by Ricoh Co., Ltd., and the electrophotographic image forming apparatus performed printing toner images on sheets up to 500,000 sheets. In other words, the fixing device including each of the above-described sets fixed the toner images on sheets up to 500,000 sheets. However, the belt guide fell off from the fixing belt before completing printing the toner images on 500,000 sheets in some sets, and the image forming apparatus stopped printing due to the occurrence of abnormal state.

Table 1 below summarizes the lubricants, the belt guides, the adhesives, the SP values thereof, and the experimental results for each of the first example to the fifth example and the first comparative example to the third comparative example described above. In Table 1, "OK" in the column of "Result of printing" means that the belt guide did not fall off from the fixing belt in the experiment, and "NG" in the column means that the belt guide fell off from the fixing belt before completing printing the toner images on the 500,000 sheets.

TABLE 1

| | Lubricant | SP value of lubricant (Mpa)$^{0.5}$ | Material for belt guide | SP value of belt guide (Mpa)$^{0.5}$ | Adhesive | SP value of adhesive (Mpa)$^{0.5}$ |
|---|---|---|---|---|---|---|
| First example | KF968-100CS | 15.21 | FE-281-U | 14.60 | FE2000 | 14.60 |
| Second example | KF968-100CS | 15.21 | FC-2179 | 13.69 | SIFEL X-71-8094-5A/B | 13.54 |
| Third example | FL-100-100CS | 14.20 | XIAMETER RBB-6660-60 | 15.60 | TSE387 | 15.30 |
| Fourth example | FL-100-100CS | 14.20 | FC-2179 | 13.69 | SIFEL X-71-8094-5A/B | 13.54 |
| Fifth example | BARRIERTA J 800 FLUID | 13.30 | FE-281-U | 14.60 | FE2000 | 14.60 |
| First comparative example | KF968-100CS | 15.20 | XIAMETER RBB-6660-60 | 15.60 | TSE387 | 15.30 |
| Second comparative example | FL-100-100CS | 14.20 | FE-281-U | 14.60 | FE2000 | 14.60 |
| Third comparative example | BARRIERTA J 800 FLUID | 13.30 | FC-2179 | 13.69 | SIFEL X-71-8094-5A/B | 13.54 |

| | Difference between SP value of lubricant and SP value of belt guide (Mpa)$^{0.5}$ | Difference between SP value of lubricant and SP value of adhesive (Mpa)$^{0.5}$ | Result of printing |
|---|---|---|---|
| First example | 0.61 | 0.61 | OK |
| Second example | 1.52 | 1.67 | OK |
| Third example | 1.40 | 1.10 | OK |
| Fourth example | 0.51 | 0.66 | OK |
| Fifth example | 1.30 | 1.30 | OK |
| First comparative example | 0.40 | 0.10 | NG |

TABLE 1-continued

| | | | |
|---|---|---|---|
| Second comparative example | 0.40 | 0.40 | NG |
| Third comparative example | 0.39 | 0.24 | NG |

As illustrated in Table 1, in all of the first example to the fifth example, the guide belt did not fall off from the fixing belt in the experiments. In all of the first example to the fifth example, the difference between the SP value of the lubricant and the SP value of the guide belt was 0.5 $Mpa^{0.5}$ or more, and the difference between the SP value of the lubricant and the SP value of the adhesive was 0.5 $Mpa^{0.5}$ or more. On the other hand, in all of the first comparative example to the third comparative example, the belt guide fell off from the fixing belt in the experiments. In all of the first comparative example to the third comparative example, the difference between the SP value of the lubricant and the SP value of the guide belt was smaller than 0.5 $Mpa^{0.5}$, and the difference between the SP value of the lubricant and the SP value of the adhesive was smaller than 0.5 $Mpa^{0.5}$. As a result, setting the difference between the SP value of the lubricant and the SP value of the guide belt and the difference between the SP value of the lubricant and the SP value of the adhesive to 0.5 $Mpa^{0.5}$ or more can prevent the belt guide from falling off from the fixing belt.

The above-described embodiments are illustrative and do not limit this disclosure. It is therefore to be understood that within the scope of the appended claims, numerous additional modifications and variations are possible to this disclosure otherwise than as specifically described herein.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

The recording medium P may be a sheet of plain paper, thick paper, thin paper, coated paper, art paper, tracing paper, overhead projector (OHP) transparency, plastic film, prepreg, or copper foil, or a postcard, an envelope, or the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2022-015727, filed on Feb. 3, 2022, in the Japan Patent Office, the entire disclosure of which is hereby incorporated by reference herein.

REFERENCE SIGNS LIST

1 Image forming apparatus
20 Fixing device
22 Pressure pad (Nip formation pad)
23 Pressure roller (Pressure rotator)
24 Fixing belt
32 Belt guide (Restriction member)
P Recording medium

The invention claimed is:

1. A belt device comprising:
a rotatable belt;
a pressure rotator opposite to the rotatable belt;
a nip formation pad inside a loop of the belt, the nip formation pad configured to form a nip between the rotatable belt and the pressure rotator;
a belt guide on an inner circumferential surface of the rotatable belt;
a member configured to come into contact with an end of the belt guide in a width direction of the rotatable belt; and
lubricant between the inner circumferential surface of the rotatable belt and the nip formation pad,
wherein a difference between a solubility parameter of the lubricant and a solubility parameter of the belt guide is 0.5 $MPa^{0.5}$ or more.

2. The belt device according to claim 1, further comprising:
adhesive configured to bond the belt guide to the rotatable belt; and
wherein a difference between a solubility parameter of the lubricant and a solubility parameter of the adhesive is 0.5 $MPa^{0.5}$ or more.

3. The belt device according to claim 2, wherein the adhesive includes at least one of silicone resin, fluorosilicone resin, fluororesin, or any combinations thereof.

4. The belt device according to claim 1, wherein the belt guide includes at least one of silicone rubber, fluorosilicone rubber, fluororubber, or any combinations thereof.

5. A belt device comprising:
a rotatable belt;
a pressure rotator opposite to the rotatable belt;
a nip formation pad inside a loop of the rotatable belt, the nip formation pad configured to form a nip between the rotatable belt and the pressure rotator;
a belt guide on an inner circumferential surface of the rotatable belt;
a member configured to come into contact with an end of the belt guide in a width direction of the rotatable belt;
lubricant between the inner circumferential surface of the rotatable belt and the nip formation pad; and
adhesive configured to bond the belt guide to the rotatable belt,
wherein a difference between a solubility parameter of the lubricant and a solubility parameter of the adhesive is 0.5 $MPa^{0.5}$ or more.

6. The belt device according to claim 1, wherein the lubricant includes at least one of silicone oil, fluorosilicone oil, fluorine oil, or any combinations thereof.

7. A fixing device comprising the belt device according to claim 1.

8. An image forming apparatus comprising:
at least one image forming device configured to form at least one image on a recording medium;
a rotatable belt;
a pressure rotator opposite to the rotatable belt;

a nip formation pad inside a loop of the rotatable belt, the nip formation pad configured to form a nip between the rotatable belt and the pressure rotator;

a belt guide on an inner circumferential surface of the rotatable belt;

a member configured to come into contact with an end of the belt guide in a width direction of the rotatable belt; and lubricant between the inner circumferential surface of the rotatable belt and the nip formation pad, wherein a difference between a solubility parameter of the lubricant and a solubility parameter of the belt guide is 0.5 $MPa^{0.5}$ or more.

9. The belt device according to claim 5, wherein the belt guide includes at least one of silicone rubber, fluorosilicone rubber, fluororubber, or any combinations thereof.

10. The belt device according to claim 5, wherein the adhesive includes at least one of silicone resin, fluorosilicone resin, fluororesin, or any combinations thereof.

11. The belt device according to claim 5, wherein the lubricant includes at least one of silicone oil, fluorosilicone oil, fluorine oil, or any combinations thereof.

12. The belt device according to claim 1, wherein the belt guide includes a plurality of portions.

13. The belt device according to claim 12, wherein the difference between the solubility parameter of the lubricant and the solubility parameter of a first portion of the belt guide is 0.5 $MPa^{0.5}$ or more, the first portion of the belt guide being an outer surface of the belt guide.

14. The belt device according to claim 12, wherein the plurality of portions includes a first portion and a second portion, the second portion being made of a different material than the first portion.

15. The belt device according to claim 14, wherein the first portion is configured to be closer to the lubricant than the second portion.

16. The belt device according to claim 1, wherein the belt guide is configured to restrict movement of the rotatable belt in a width direction.

17. The belt device according to claim 1, further comprising:

a heating roller configured to heat a surface of the rotatable belt.

18. The belt device according to claim 17, wherein the heating roller includes at least one first heater.

19. The belt device according to claim 18, wherein the at least one first heater is an induction heater.

20. The belt device according to claim 17, wherein the pressure rotator includes at least one second heater, the at least one second heater configured to heat the nip.

* * * * *